J. W. ROWE.
RELIEF VALVE.
APPLICATION FILED JUNE 10, 1907.

899,077.

Patented Sept. 22, 1908.

WITNESSES:
Edgar M. Greenbaum
Charles V. Guyer

INVENTOR
John W. Rowe.
BY
E. F. Lennett
ATTORNEY

UNITED STATES PATENT OFFICE.

JOHN W. ROWE, OF SOMERVILLE, MASSACHUSETTS, ASSIGNOR TO NORWALL MANUFACTURING COMPANY, OF NEW YORK, N. Y., A CORPORATION OF ILLINOIS.

RELIEF-VALVE.

No. 899,077.  Specification of Letters Patent.  Patented Sept. 22, 1908.

Application filed June 10, 1907. Serial No. 378,069.

*To all whom it may concern:*

Be it known that I, JOHN W. ROWE, a citizen of the United States, and resident of Somerville, in the county of Middlesex and State of Massachusetts, have invented certain new and useful Improvements in Relief-Valves, of which the following is a specification.

My invention relates to improvements in relief-valves for steam heating system &c. in which a partial vacuum is created in the return pipe by suitable vacuum creating devices, the object of my invention being the production of an automatic valve devoid of floats, springs, thermostatic or other similar means for making said valve operative, my purpose being to so simplify said valves as to make them less liable to get out of order.

Heretofore the draining of radiators &c.
has been done by valves provided with either floats, diaphragms, springs or thermostatic devices, all or several of which being elements in each of the different valves to make such valve operative, and the failure of anyone of these parts to perform its function, causes the valve to fail.

My invention is illustrated in the accompanying drawing in which

Figure 1:
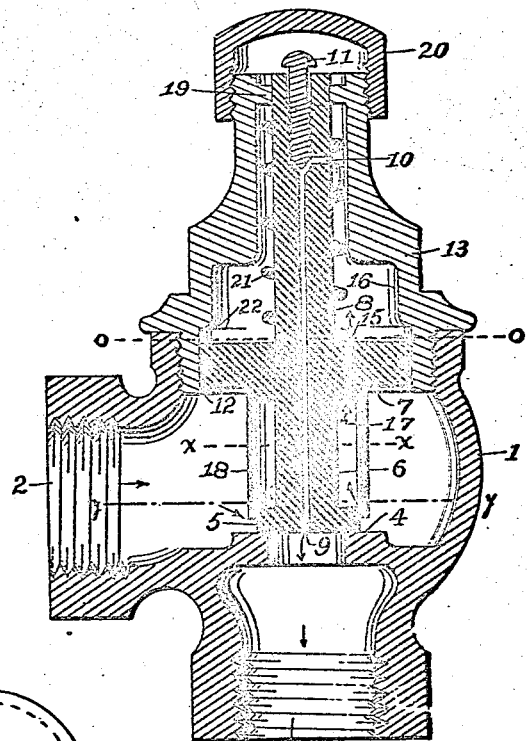
Figure 2:
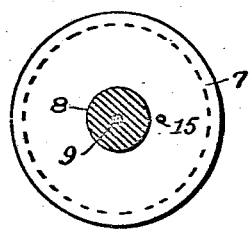
Figure 3:
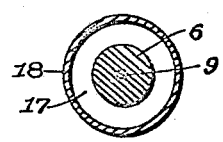

Figure 1 is a vertical sectional view, Fig. 2 a horizontal sectional view of the sliding valve stem on line O—O of Fig. 1. Fig. 3 is a horizontal sectional view of the said stem and sleeve on line X—X of Fig. 1 and Fig. 4 is a vertical sectional view of a modification of my improved valve.

Similar reference numbers indicate similar parts in the several views.

The body 1 has the usual thoroughfare formed by an inlet 2 and an outlet 3 and with a valve seat 4 upon the outlet, which is closed by a valve member 5 when in normal position. The valve 5 is formed with parallel sides and is preferably integral with a stem 6 and plunger or piston 7, the latter serving as the "motor" for operating the valve, and with a guide extension 8. The valve stem and extension 8 are provided with a small vent hole 9, said hole terminating in and connecting with a side hole 10 near the upper end of the extension portion, the opening of which is controlled by a cone-pointed screw valve 11. The piston or plunger portion 7 of the device fits closely into the cylindrical part 12 of the hood 13, the piston having a
vent 15 which communicates with the chamber ber 16 in the hood. Depending from the piston 7 is a sleeve 18, suitably fastened to the under side of the piston, the diameter of this sleeve being slightly larger than that of the valve 5 so as to leave a small annular space between the inner surface of the sleeve and the outer face of the valve. This annular space is relatively slight and produces a capillary effect upon the water as it rises in the main chamber of the valve casing and causes it to pass slowly into the space between the sleeve 18 and the stem 6, this space forming a chamber indicated at 17. An annular inner flange 19 at the top of the hood 13 serves as a guide for the extension 8, and 20 is a cap over the upper end of the hood 13 and inclosing the upper end of the portion 8. The spring 21 is adapted to be used as a bumper or cushion and is preferably employed to cushion the valve and prevent injury thereto if the valve opens suddenly. By this arrangement instead of the piston striking against the shoulder 22 in the hood the spring will receive the impact and absorb it, thus rendering the valve "cushioned" and "noiseless".

Figure 4:
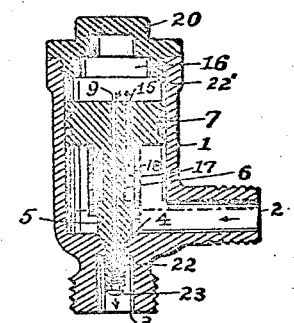

The modified structure shown in Fig. 4 is substantially the same as that shown in Fig. 1, except that the body is smaller and adapted to be placed at a higher point upon the radiator, the latter not being shown. In the modified structure a guide stem 22' and a regulating screw 23 is placed below the valve 5 instead of above as shown in Fig. 1 and the piston articulates with the body instead of with the hood.

The dot and dash lines in Figs. 1 and 4 show the water line.

Such being the construction, the operation is as follows: When the relief-valve is connected with a radiator and with a vacuum creating device, and the steam is turned on in the radiator to which the device is attached, the air will be driven out through the sleeve chamber 17 the vent 15, the chamber 16 the side hole 10 and the valve stem vent 9, as shown by the arrows, the quantity of air passing there-through being regulated by the adjusting screw 11 to suit the location of the radiator according to its distance from the steam generating means. When the water of condensation enters the valve casing at 2, it finds no outlet as the valve is held normally closed, hence the water is confined until the level rises above the annular opening formed between the valve 5 and the sleeve 18 which it closes and prevents the escape of air; but as the vacuum creating means continues to draw the air confined in the chamber 16, the piston is drawn upward,—by reason of its area being much larger than the area of the valve,—and held in that position until the water level is reduced to a point below the free end of the sleeve, when the vacuum in the upper chamber is destroyed and the valve permitted to close against the water but open to the escape of air, and when the level of the gathered water of condensation again reaches a point indicated by the dot and dash line y—y, the operation is repeated.

It is to be noted that the sleeve 18 overlaps the valve 5 and forms a restricted passage between the sleeve and valve establishing communication between the chamber 17 and the chamber in the valve body 1. This sleeve 18 is extended to overlap the valve 5 in this manner so as to cause the valve to act at more frequent intervals, effected by the moisture of the air and steam condensing and sealing the restricted passage at short intervals owing to the capillary attraction of the water to the vertical sides of this passage. When the opening is sealed, the piston rises and allows the water to pass out through the opening 3. This of course breaks the seal, and as the valve immediately closes again, this frequent action keeps the small air passage through the piston free from any dirt which might tend to close it. The intermittent feature caused by the capillary seal tends therefore to keep the valve clear and insures no resistance to the steam flowing to the radiator or heater to which the device is attached, or in other words, the device provides for the discharge of the air, and operates to discharge the water immediately on the small quantity of water accumulating that is required to establish the seal. Without the seal, it is obvious that there would be a constant passage of air and steam through the valve.

It will be seen from the foregoing description that there are no parts liable to get out of working order, and when desired, the cap or hood 13 can be unscrewed and the inner working parts cleaned or removed for examination without in any manner disturbing any complicated mechanism or requiring removal of the valve from the radiator for the purpose of such examination or cleaning. No error can be made in reassembling as the operating part is reduced to a single piece, namely the combined piston 7, valve 5, and guide 8, which articulates with the valve body.

Such being my invention what I claim as new and desire to secure by Letters Patent is:

1. In a relief valve, a valve body having an inlet and an outlet, a valve controlling the flow of liquid through said valve body and formed with parallel sides, a motor device embodying a piston carried by the stem of said valve and dividing the space in the valve body into two chambers, a sleeve depending from said piston and partly overlapping the parallel sides of the valve and slightly spaced therefrom, said piston provided with two restricted passages, one connecting the chamber above the piston with the chamber between the depending sleeve and the valve stem and the other connecting the chamber above the piston with the valve outlet.

2. In a relief valve, a valve body having an inlet and an outlet, a valve controlling the flow of fluid through said valve body, a motor device embodying a piston carried by the stem of said valve and dividing the space in the valve body into two chambers, and provided with a vent, a sleeve depending from said piston exteriorly of the vent thereof with its free end overlapping said valve and slightly spaced therefrom, the vent in said piston connecting the chamber above the piston with the chamber between the depending sleeve and the valve stem, and a restricted passage through the piston connecting the chamber above the piston with the valve outlet.

3. In a relief valve, a valve body having an inlet and an outlet, a valve controlling the flow of fluid through said body, a motor device embodying a piston carried by the stem of said valve and dividing the space in the valve body into two chambers, a sleeve depending from said piston with its free end overlapping said valve and slightly spaced therefrom, a restricted air passage through the piston connecting the chamber above the piston with the chamber between the depending sleeve and the valve stem, and a second restricted air passage through the piston connecting the chamber above the piston with the outlet, and means for regulating the flow of air through said last named passage.

Signed at the city in the county of New York and State of New York this 29th day of May A. D. 1907.

JOHN W. ROWE.

Witnesses:
E. S. STORM,
CHARLES V. DWYER.